Aug. 11, 1942.   J. F. O'BRIEN   2,292,395
COMPOSITE ELECTRICITY CONDUCTOR UNIT
Filed Feb. 6, 1940
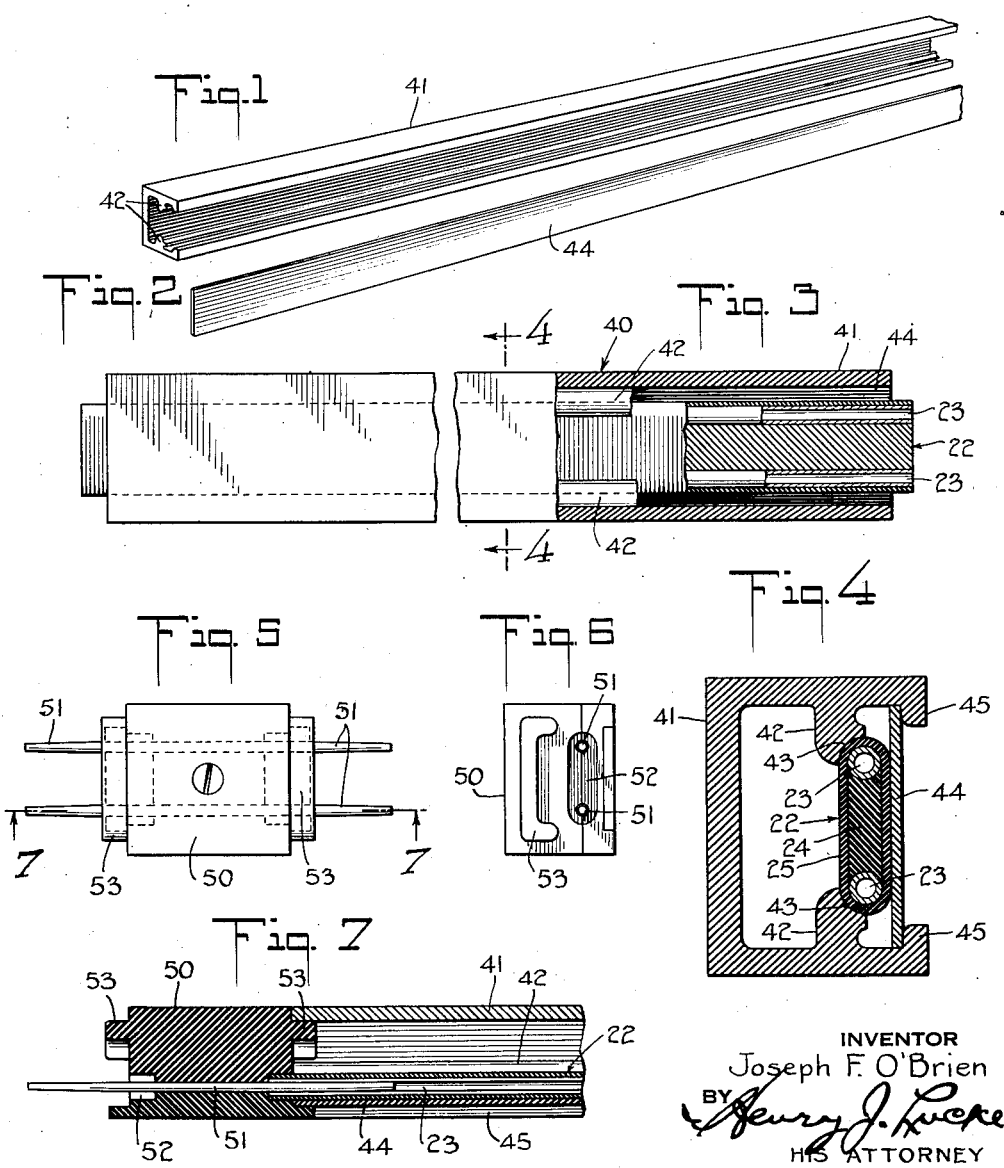
INVENTOR
Joseph F. O'Brien
BY Henry J. Lucke
HIS ATTORNEY Patented Aug. 11, 1942

2,292,395

UNITED STATES PATENT OFFICE 2,292,395

COMPOSITE ELECTRICITY CONDUCTOR UNIT

Joseph F. O'Brien, Jersey City, N. J., assignor to John B. Pierce Foundation, New York, N. Y., a corporation of New York Application February 6, 1940, Serial No. 317,480

4 Claims. (Cl. 174—101)

This invention relates to improved electrical wiring systems.

In particular, the invention relates to improved electrical wiring systems comprising conductor carrying "run" units for installation in seriatim electrical and mechanical relationship, desirably through the agency of intermediate "connector" units, which latter units may embody outlet means, affording provision for the connection of electrical attachments thereto.

Further, the invention relates to improved electric wiring systems arranged for exposed installation, as contrasted to conventional concealed wiring installations in which the electric conductors are run in BX cable or the like within the wall of a building or room partitions thereof.

Among the objects of the invention are: to provide an improved electrical wiring system, aforesaid, in which the conductor units may be employed as a part of the structural trim of the building, as by disposition at, or attachment to, the baseboard or other structural building trim; to provide an improved electric wiring system comprising conductor units of composite nature, in which a conductor containing insulated core unit is housed within an outer shell unit of molded plastic, metal, or other suitable material affording the desired configuration and decorative effect. Such conductor-containing core unit embodies electrical conductors in uniformly spaced and electrically insulated status; to provide a composite conductor unit as aforesaid, of which the outer or shell unit may be formed by manufacturing processes including molding, extruding, or the like; and to provide an electrical wiring system in which the conductor carrying units and the units affording seriatim mechanical and electrical connection thereof embody means whereby the joints of such interconnected units may be "broken" and protected to preclude any possibility of accidental contact with the conductors thereof, as by the insertion of a knife blade, wire, or like relatively thin metallic element into such composite unit at the points of juncture thereof.

In the present invention, the conductor carrying unit may embody an outer shell member, as aforesaid, within which shell member are disposed channel means, tracks, or the like arranged to slidably receive, and uniformly position, a conductor containing core element. Desirably, such outer shell units are of standard length, and for operative association with such standard length units, the conductor bearing core units may project suitably from each end of the outer shell unit.

For purposes of interconnection of the conductors of successive core units, there may be employed connector units embodying outlet means if desired, and having, in the end walls thereof, sockets for the reception of the projecting ends of the core units. Electrically conductive pins or equivalent may be employed to interconnect the conductors within the connector units with the conductors within the core unit. To accurately position the shell units with relation to the connector units, and to afford protection of the interconnected unit at the joint, each connector unit may be provided, at each end thereof, with an extending lug, rib, or the like, such lug being so positioned with respect to the outer wall surfaces of the connector element as to interfit with, and accurately engage, the inner wall surfaces of the outer shell of the conductor unit, to effect a juncture thereof substantially without visible break, thus achieving substantial visual continuity of the assembled units.

Other features and advantages will hereinafter appear.

In the drawings:

Fig. 1 is a perspective of a form of housing element of an improved conductor unit pursuant to the present invention;

Fig. 2 represents a closure wall for such housig element;

Fig. 3 is a representation of an assembled conductor unit, partly in section;

Fig. 4 is a transverse section taken through lines 4—4 of Fig. 3;

Fig. 5 is a plan view of a form of connector unit for seriatim mechanical and electrical interconnection with conductor units;

Fig. 6 is an end view of such connector unit; and

Fig. 7 is a sectional elevation of the connector unit of Fig. 5 and the conductor unit of Fig. 3 in interconnected status.

The electricity conductor unit 40 illustrated in Fig. 3, may comprise a preferably three-sided housing 41, see Fig. 1, suitably shaped to facilitate its formation by extrusion, from plastic, rubber, metal, or other suitable material. The illustrated construction affords the ready manufacture of such element 41 by extrusion of metal. Housing element 41 may be used in combination with core element 22, and to properly position such core element 22 within housing 41, such housing has internal longitudinally extending co-planar flanges 42, 42, formed in the side walls of the housing. Such flanges, see Fig. 4, form a skeletonized channel or trackway, in that the inner wall portions 43, 43, thereof form a cradle which engages side wall portions of the core element 22, to support the same. To secure such core unit 22 within the housing 41, I prefer to use a back member 44 of metal, fibre, plastic or the like, positioned within the housing element 41. Member 44 may be held in position by bearing against the walls of flange means 45, 45, of such housing element, or by adhesive or mechanical fastening. Flanges 45, 45, in association with back means 44, complete the substantially tubular form of the housing element. Such back means 44 may or may not be imperforate, as desired.

Core element 22 may desirably embody tubular electric conductors 23, 23, maintained in uniformly spaced insulated relationship by means of a spine 24, of rubber, molded plastic, or other suitable insulation material, and externally insulated by any suitable means, such as an envelope 25 of braided glass wool insulation or the like.

The positioning of wall surfaces 43, 43 of flanges 42, 42, with respect to the internal surface of insert piece 44, insures that such core element 22 is adequately frictionally held in position; desirably, the thickness of core unit 22 should "spring" the insert piece 44 somewhat, so that the resilience of such backing means 44 may serve to maintain the proper positioning of core unit 22.

As appears in Fig. 3, the end walls of the housing element 41 are desirably square; core element 22 is preferably of suitable length to project beyond the end surfaces of said housing 41. Desirably, the extent of projection is of the order of three-sixteenths of an inch at each end.

The connector unit 50, see Fig. 5, may comprise a two-piece body portion, desirably of electrical insulation material, within which body portion are disposed paired conductor means 51, 51 having projecting elements, suitably tapered, for insertion into the tubular conductors 23, 23, of core element 22. As clearly appears from Figs. 6 and 7, connector unit 50 is provided with a socket 52 at each end thereof, said sockets receiving the projecting end portion of core unit 22. To protect the zone of connection of core unit 22 with the conductor pins 51, and to accurately position housing unit 41 with respect to connector unit 50, such connector units are formed with projecting lugs 53, 53 having, in the form illustrated, a channel configuration in which the upper and outer side wall surfaces serve to engage the inner surfaces of the upper and side walls of such housing unit 41.

The uniformity of cross section of housing element 21, and the uniformity of cross section, conductor location and positioning of core element 22, afford the shortening of an initially standard unit as desired, merely by slidably displacing the core 22 within the housing element 21 a distance greater than the amount to be cut from the housing element, and then cutting the required amount from such housing element with a mitre saw or like tool affording a clean sharp cut, and subsequently cutting an equal amount from the core unit. Upon repositioning the core unit within housing 21, the conductor unit 20 is ready for seriatim interconnection, as presently described.

Whereas I have described my invention by reference to specific forms thereof, it will be understood that many changes and modifications may be made without departing from the spirit of the invention.

I claim:

1. An improved conductor unit for a wiring system, comprising, in combination, a substantially tubular housing element, rib means projecting inwardly from opposite side walls of said housing element to provide mutually spaced surfaces disposed intermediate the upper and lower walls of said housing affording a continuous trackway uniformly positioned within said housing, electricity conductor means disposed within said housing and extending longitudinally thereof on said trackway, and plate means disposed within said housing and arranged to bear against said electricity conductor means to confine said conductor means against said trackway and maintain said conductor means in uniform position throughout said housing.

2. An electricity conductor unit for a wiring system, comprising, in combination, a channel-like housing element having a flange projecting inwardly from each of the side walls of said housing element, said flanges being in a common plane, a conductor containing core unit supported within said housing element upon said flanges and extending continuously longitudinally of said housing element to project from the ends thereof, and plate means operatively associated with said housing element and said core unit and adapted to urge said core unit into engagement with said supporting flanges.

3. An improved conductor unit for a wiring system, comprising, in combination, a substantially tubular housing element, rib means projecting inwardly from opposite side walls of said housing element to provide mutually spaced surfaces disposed intermediate the upper and lower walls of said housing affording a continuous trackway uniformly positioned within said housing, a conductor-containing core unit of materially less depth than the depth of the tubular interior of the housing and having a width less than the wall to wall width of the housing slidably disposed within said housing element on said trackway, and removable back plate means associated with said housing element and resiliently bearing against said core unit to urge the same into engagement with said trackway to secure said core unit in uniform position on said trackway throughout the said housing.

4. An electricity conductor unit for a wiring system, comprising, in combination, a channel-like housing element having a flange projecting inwardly from each of the side walls of said housing element, said flanges being in a common plane, conductor means supported within said housing element upon said flanges and extending continuously longitudinally of said housing element to project from the ends thereof, and plate means operatively associated with said housing element and said conductor means and adapted to urge said conductor means into engagement with said supporting flanges.

JOSEPH F. O'BRIEN.